United States Patent
Park et al.

(10) Patent No.: US 8,971,687 B2
(45) Date of Patent: *Mar. 3, 2015

(54) IMAGE DISPLAYING APPARATUS, IMAGE EDITING APPARATUS, IMAGE EDITING SYSTEM, AND METHOD FOR DISPLAYING AND EDITING IMAGE USING THE SAME

(71) Applicant: Samsung Electronics Co., Ltd., Suwon-si (KR)

(72) Inventors: Ji-hyun Park, Seoul (KR); Dae-gu Kim, Gwacheon-si (KR); Il-kwon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

This patent is subject to a terminal disclaimer.

(21) Appl. No.: 13/645,204

(22) Filed: Oct. 4, 2012

(65) Prior Publication Data

US 2013/0028572 A1    Jan. 31, 2013

Related U.S. Application Data

(63) Continuation of application No. 12/550,460, filed on Aug. 31, 2009, now Pat. No. 8,301,006.

(30) Foreign Application Priority Data

Sep. 12, 2008 (KR) .................. 10-2008-0090553

(51) Int. Cl.
*H04N 5/765* (2006.01)
*H04N 5/77* (2006.01)
*H04N 5/93* (2006.01)
*H04N 1/387* (2006.01)

(52) U.S. Cl.
CPC .................. *H04N 1/3871* (2013.01)
USPC .............. 386/200; 386/225; 386/278

(58) Field of Classification Search
USPC .............. 386/200, 225, 224, 219, 230, 278
See application file for complete search history.

(56) References Cited

U.S. PATENT DOCUMENTS

| | | |
|---|---|---|
| 6,701,526 B1 | 3/2004 | Trovato |
| 2007/0013801 A1 | 1/2007 | Sezan et al. |
| 2007/0132872 A1* | 6/2007 | Sato et al. ............ 348/333.01 |

FOREIGN PATENT DOCUMENTS

| | | |
|---|---|---|
| KR | 10-2001-0059871 A | 7/2001 |
| KR | 10-2004-0094350 A | 11/2004 |
| KR | 10-2008-0034335 A | 4/2008 |

OTHER PUBLICATIONS

Communication dated Jun. 21, 2014 issued by Korean Intellectual Property Office in counterpart Korean application No. 10-2008-0090553.

* cited by examiner

*Primary Examiner* — Robert Chevalier
(74) *Attorney, Agent, or Firm* — Sughrue Mion, PLLC

(57) ABSTRACT

An image displaying apparatus, an image editing apparatus, an image editing system, an image displaying method and an image editing method are disclosed. The image displaying apparatus includes an image processing unit which captures a still image, a communication module which communicates with an external device, and a control unit which controls an edited image to be displayed.

14 Claims, 9 Drawing Sheets

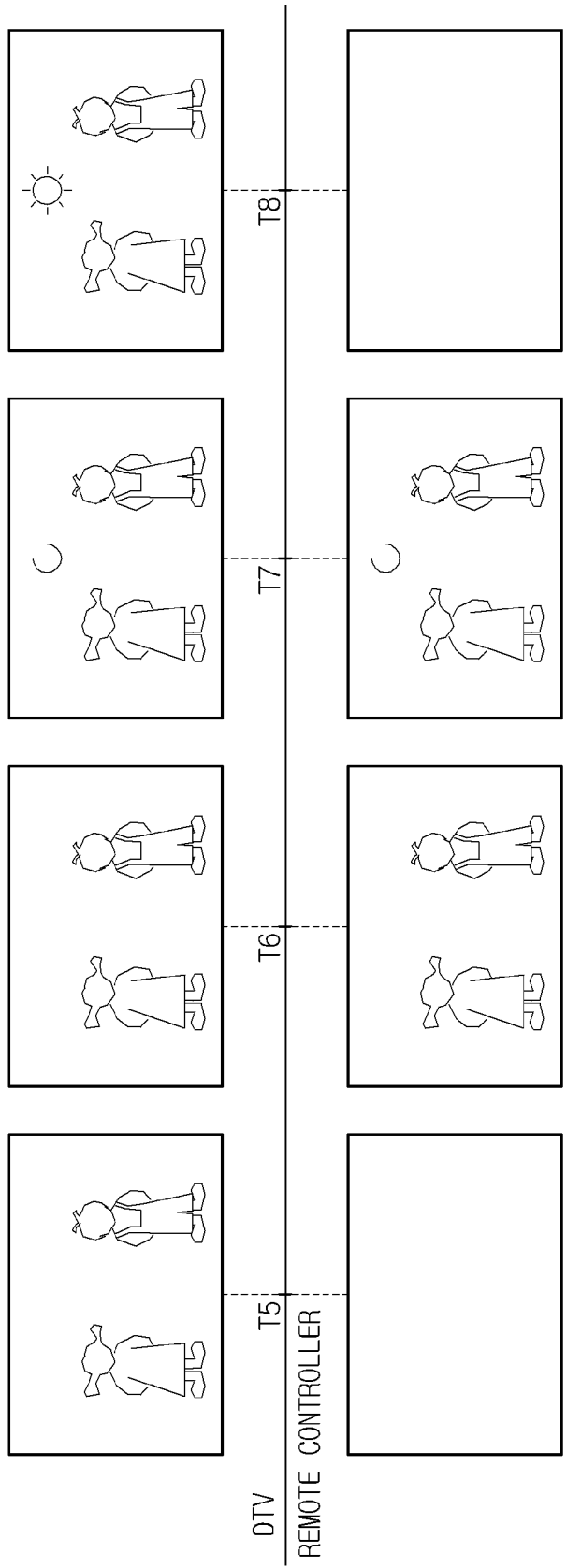

IMAGE DISPLAYING APPARATUS, IMAGE EDITING APPARATUS, IMAGE EDITING SYSTEM, AND METHOD FOR DISPLAYING AND EDITING IMAGE USING THE SAME

CROSS-REFERENCE TO RELATED APPLICATIONS

This application is a continuation application of U.S. patent application Ser. No. 12/550,460, filed Aug. 31, 2009, which claims priority from Korean Patent Application No. 10-2008-0090553, filed on Sep. 12, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to editing and displaying an image, and more particularly, to capturing a still image, editing the captured image and displaying an edited image.

2. Description of the Related Art

Display apparatuses typically display content stored in storage media or broadcast content received via wire or wirelessly, on screens.

As a result of an increase in the size of display apparatuses and the widespread use of portable display apparatuses, the amount of content able to be provided by display apparatuses has increased exponentially.

Additionally, users can select desired content from a variety of content and view or listen to the selected content.

However, there is demand among users to be able to utilize content more actively and reproduce their own content, rather than only viewing or listening to content produced by content producers.

Therefore, there is a need for methods to utilize content more conveniently according to users' desires to actively utilize content.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an image displaying apparatus, an image editing apparatus and an image editing system which captures a still image, edits the captured image and displays an edited image, and an image displaying method and an image editing method using the image displaying apparatus, image editing apparatus and image editing system.

According to an aspect of the present invention, there is provided an image displaying apparatus comprising an image processing unit which captures an image of a video; a communication module which transmits the captured image to an external device, and receives an edited image generated using the captured image from the external device; and a control unit which controls the video or the edited image to be displayed according to whether the image of the video is captured or whether the edited image is received.

The edited image may comprise at least one of an edited image in progress, which is presented while editing of the captured image is in progress, and a final edited image that is presented after the captured image is completely edited.

If the image of the video is captured, the control unit may control such that display of the video may be paused and that the edited image in progress which is received from the external device may be displayed.

If the final edited image is received, the control unit may control such that display of the video may be paused and that the final edited image may be displayed.

The video may be a broadcast being displayed. If display of the broadcast is paused, the control unit may control such that a portion of the broadcast received from a time when the display of the broadcast is paused may be stored.

If a command to store the video is received, the control unit may replace the captured image with the edited image and control the video to be stored.

According to another aspect of the present invention, there is provided an image editing apparatus comprising a communication module which receives an image from an image displaying apparatus; an interface unit which generates an edited image using the image received from the image displaying apparatus; and a control unit which controls the edited image generated by the interface unit to be transmitted to the image displaying apparatus.

The image may be an image captured from a video displayed on the image displaying apparatus.

The interface unit may be a touch screen, and the edited image may comprise an image to which a graphic input through the touch screen is added.

According to another aspect of the present invention, there is provided an image editing system comprising a first device which captures an image of a video, receives an edited image generated using the captured image, and displays the video or the edited image according to whether the image of the video is captured or whether the edited image is received; and a second device which receives the captured image from the first device, edits the received image and transmits the edited image to the first device.

The first device may receive the edited image from the second device in real time.

The first device may be a broadcast receiving apparatus which receives a broadcast and displays the received broadcast, and the second device may be a remote control apparatus which is connected to the first device wirelessly to operate the first device.

According to another aspect of the present invention, there is provided an image displaying method comprising capturing an image of a video; transmitting the captured image to an external device; receiving an edited image from the external device; and displaying the video or the edited image.

The edited image may comprise at least one of an edited image in progress, which is presented while editing of the captured image is in progress, and a final edited image that is presented after the still image is completely edited.

The displaying may comprise, if the image of the video is captured, controlling such that display of the video is paused and that the edited image in progress which is received from the external device is displayed.

The displaying may comprise, if the final edited image is received, controlling such that display of the video is paused and that the final edited image is displayed.

The image displaying method may further comprise receiving a command to store the video; and replacing the captured image with the edited image and storing the video, if the command to store the video is received.

According to another aspect of the present invention, there is provided an image editing method comprising receiving an image from an image displaying apparatus; generating an edited image using the image received from the image displaying apparatus; and transmitting the edited image to the image displaying apparatus.

The image may be an image captured from a video displayed on the image displaying apparatus.

The edited image may comprise an image on which a graphic input through a touch screen or a prestored graphic is added.

BRIEF DESCRIPTION OF THE DRAWINGS

The above and/or other aspects of the present invention will be more apparent by describing certain exemplary embodiments of the present invention with reference to the accompanying drawings, in which:

FIGS. 6A and 6B are views provided to explain images displayed on a digital television (DTV) and remote controller in temporal sequence.

DETAILED DESCRIPTION OF EXEMPLARY EMBODIMENTS

Figure 1:
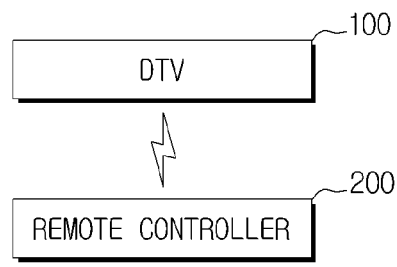
FIG. 1 is a block diagram of an image editing system to which the present invention is applicable.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of an image editing system to which the present invention is applicable. The image editing system shown in FIG. 1 comprises a digital television (DTV) 100 as a broadcast receiving apparatus, and a remote controller 200 as a remote control apparatus.

The DTV 100 provides a user with a broadcast received via wire or wirelessly, and the remote controller 200 receives a user command for the DTV 100. The DTV 100 is connected to the remote controller 200 using radio frequency (RF) communication, thus enabling mutual communication. Accordingly, the remote controller 200 may transfer an input user command to the DTV 100.

The DTV 100 captures a still image of a currently received broadcast, and transfers the captured image to the remote controller 200. The remote controller 200 then receives the captured image, edits the received image and transmits the edited image to the DTV 100.

Figure 2:
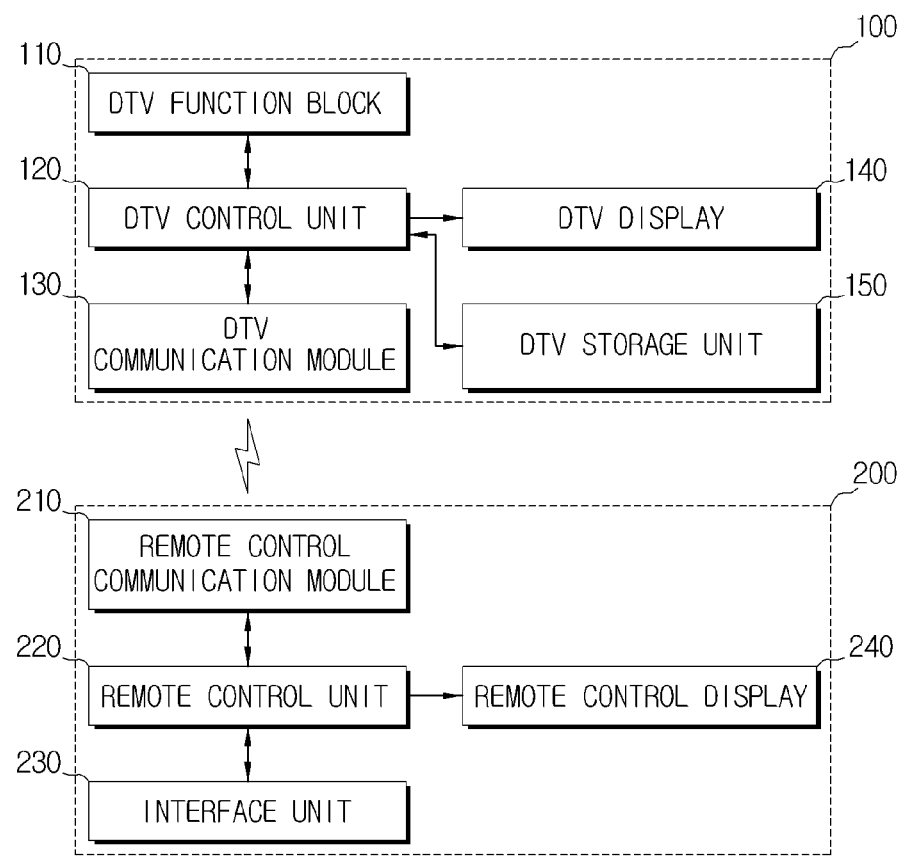
FIG. 2 is a detailed block diagram of the image editing system shown in FIG. 1.

The image editing system as configured above will be described in detail with reference to FIG. 2. FIG. 2 is a detailed block diagram of the image editing system shown in FIG. 1.

In FIG. 2, the DTV 100 comprises a DTV function block 110, a DTV control unit 120, a DTV communication module 130, a DTV display 140 and a DTV storage unit 150.

The DTV function block 110 performs the basic functions of the DTV 100. In more detail, the DTV function block 110 receives a digital broadcast signal and demodulates the received digital broadcast signal. The DTV function block 110 then performs signal processing on the demodulated digital broadcast signal to be decoded, and transfers the processed signal to the DTV display 140, so that a user may view a digital broadcast displayed on the DTV display 140.

The DTV communication module 130 is connected to the remote controller 200 using RF communication, enabling mutual communication. The DTV communication module 130 transfers a captured image, which is captured from video displayed on the DTV 100 in response to a user capture command, to the remote controller 200. The user capture command may be input by a user using a selection unit such as a button on the DTV 100, or may be input wirelessly via the remote controller 200. Additionally, the DTV communication module 130 may receive an edited image transmitted from the remote controller 200.

The "edited image" refers to an image on which graphics created or preset by a user are to be superimposed. Here, graphics comprise text such as letters, numbers or symbols, and images such as diagrams, photographs or drawings. An example of the edited image will be described below with reference to FIGS. 3A to 3C.

Figure 3A:
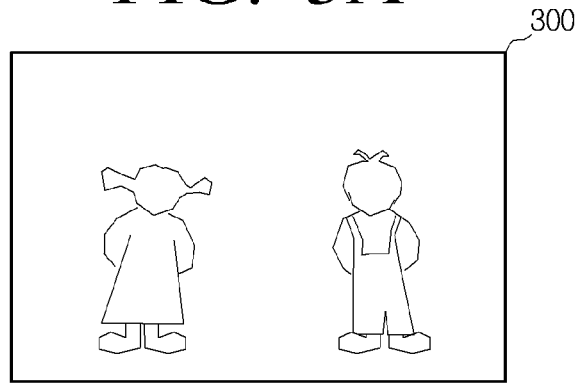
FIGS. 3A to 3C are views provided to explain an edited image according to an exemplary embodiment of the present invention.
Figure 3B:
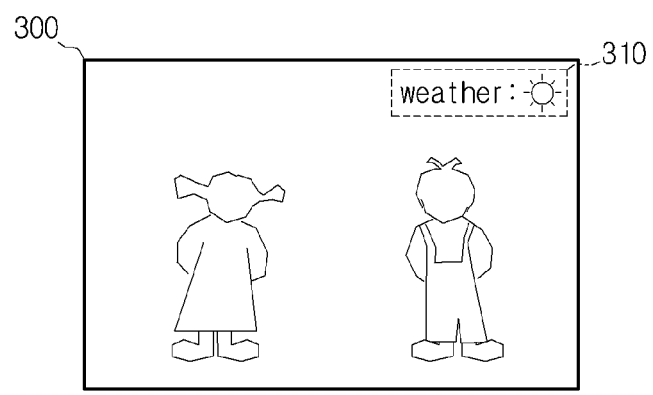
Figure 3C:
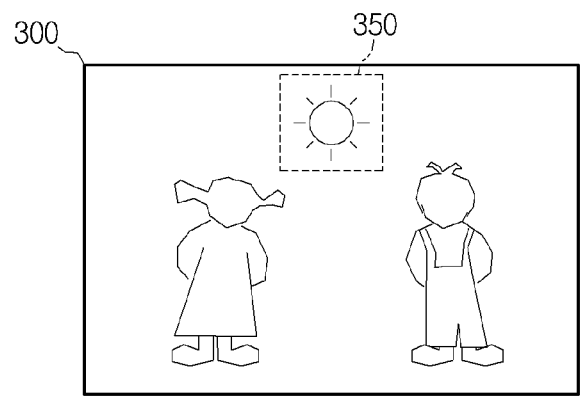

FIGS. 3A to 3C are views provided to explain an edited image according to an exemplary embodiment of the present invention. FIG. 3A exemplarily illustrates a captured image 300 captured from a currently displayed broadcast in response to the user capture command. The captured image 300 is transmitted to the remote controller 200, and displayed on a remote control display 240 of the remote controller 200.

FIG. 3B exemplarily illustrates an edited image generated when preset graphics are added to the captured image 300. In the exemplary embodiment of the present invention, a weather graphic 310 is set in advance. The weather graphic 310 may be prestored in the DTV 100 or may be received from an external server through the Internet, rather than created by a user.

In more detail, a user may add graphics prestored in the DTV storage unit 150, or graphics received from an external server to the captured image 300, in order to edit the captured image 300. For editing the captured image 300, the DTV 100 may further comprise a network interface (not shown).

While the weather graphic 310 is added to the captured image 300 in the exemplary embodiment of the present invention, graphics representing information, such as the time or stock reports, or text previously written by a user may also be added to the captured image 300.

FIG. 3C exemplarily illustrates an edited image generated when a graphic 350 created by a user is added to the captured image 300. In other words, the user may manually add/draw the graphic 350 on the captured image 300 using the remote controller 200 in order to create the image shown in FIG. 3C.

In order for a user to add/draw graphics, an interface unit 230 of the remote controller 200 may be implemented as a touch pad, or the remote control display 240 of the remote controller 200 may act as a touch screen.

The "edited image" may be an "edited image in progress" and a "final edited image". The "edited image in progress" is an image showing a process of editing a captured image in real time. The "final edited image" is an image after editing is completed.

Specifically, the edited image in progress may be transmitted from the remote controller 200 to the DTV 100 in real time, and may then be displayed on the DTV 100. Alternatively, the final edited image may be transmitted to the DTV 100, instead of showing the edited image in progress during the editing process.

Examples of the edited image in progress and the final edited image will be described below with reference to FIGS. 4A to 4D.

Figure 4A:
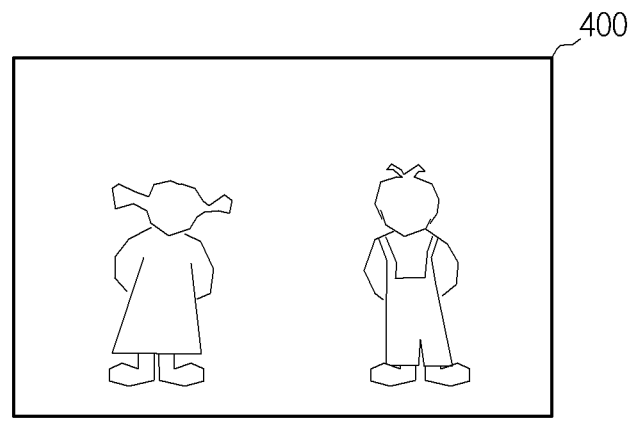
FIGS. 4A to 4D are views provided to explain an edited image in progress and a final edited image according to an exemplary embodiment of the present invention.
Figure 4B:
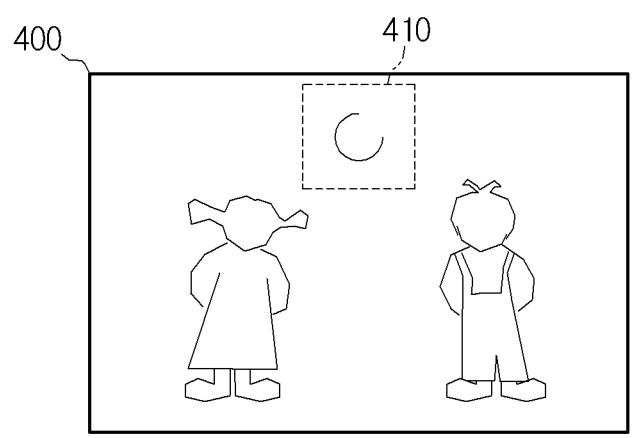
Figure 4C:
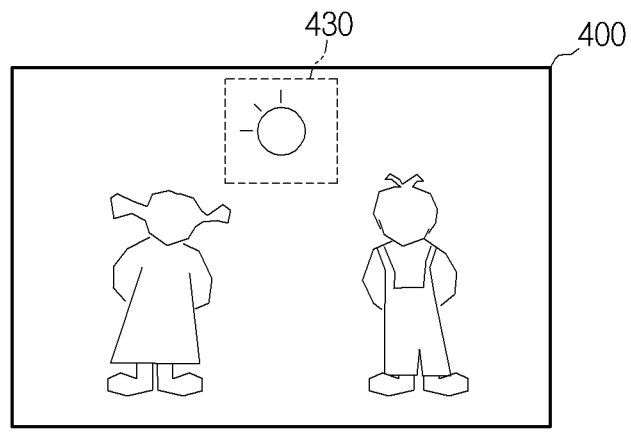
Figure 4D:
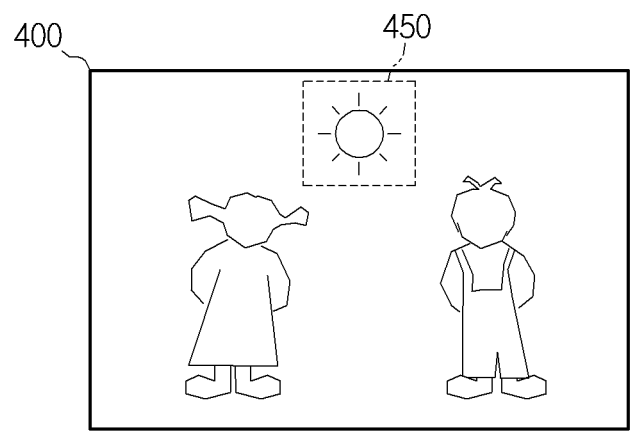

FIGS. 4A to 4D are views provided to explain an edited image in progress and a final edited image according to an exemplary embodiment of the present invention. FIG. 4A exemplarily illustrates a captured image 400 captured from a currently displayed broadcast in response to the user capture command, and FIGS. 4B and 4C exemplarily illustrate an edited image in progress. FIG. 4D exemplarily illustrates a final edited image of the captured image 400 that a user finishes editing by creating a graphic 450.

In other words, FIGS. 4A to 4D depict a process of drawing graphics 410, 430 and 450 to be superimposed on the captured image 400 in temporal sequence.

As the editing process is performed by the remote controller 200, the remote control display 240 may display the captured image 400, the 'images in progress of editing' and the final edited image.

The user may have an option of determining whether to display the edited image in progress on the DTV 100. In more detail, if the user sets the edited image in progress to be displayed, the DTV 100 may display the images shown in FIGS. 4B and 4C, and alternatively, if the user sets the edited image in progress not to be displayed, the DTV 100 may display only the final edited image shown in FIG. 4D.

If the user desires to display only the final edited image, the DTV 100 may continue to display a currently received broadcast during the editing process.

Referring back to FIG. 2, the DTV communication module 130 transfers an edited image to the DTV control unit 120. The DTV control unit 120 then transfers the edited image to the DTV display 140.

The DTV display 140 displays a broadcast received by the DTV function block 110 or an edited image received via the DTV communication module 130. In this situation, whether to display the broadcast or the edited image may be determined according to user settings.

In more detail, if the DTV 100 is set to continue to display the currently received broadcast on receipt of the user capture command, the DTV display 140 may continue to display the currently received broadcast. Alternatively, if the DTV 100 is set to stop display of the currently received broadcast on receipt of the user capture command, the DTV display 140 may stop the display of the broadcast and instead display the captured image.

Additionally, the user may also set whether to display an edited image in progress according to the user edit command, even when the captured image is displayed. If the edited image in progress is set to be displayed, the DTV communication module 130 may receive the edited image in progress from the remote controller 200 in real time, and the DTV display 140 may display the received images in real time. For example, the DTV display 140 may display the images shown in FIGS. 4A to 4D in real time.

If only the final edited image is set to be displayed, the DTV communication module 130 may receive the final image from the remote controller 200 according to a transmission command to transmit the final image input by a user using the remote controller 200. In this situation, the DTV display 140 may continue to display the captured image 400 shown in FIG. 4A until the transmission command is received from the remote controller 200, and if the transmission command is received from the remote controller 200, the DTV display 140 may display the final edited image shown in FIG. 4D.

The DTV storage unit 150 stores programs required to operate the DTV 100. The DTV storage unit 150 may be implemented as a memory, a hard disk drive (HDD) or other storage media well known in the related art. Additionally, the DTV storage unit 150 stores graphics preset by a user, for example the graphic 310 shown in FIG. 3B.

If the DTV 100 is set to stop display of the currently received broadcast on receipt of the user capture command, the DTV display 140 may stop the display of the broadcast and instead display the captured image, as described above. In this situation, the DTV storage unit 150 may store a portion of the broadcast received while the display of the broadcast is paused, in order for a user to view the portion of the broadcast later.

The DTV control unit 120 controls the operations of the DTV function block 110, DTV communication unit 130, DTV display 140 and DTV storage unit 150, in response to user commands received via the DTV communication unit 130 from the remote controller 200.

In more detail, the DTV control unit 120 controls the DTV function block 110 to receive a digital broadcast signal via a channel selected by a user, demodulate the received digital broadcast signal, and perform signal processing on the demodulated digital broadcast signal to be decoded.

Additionally, the DTV control unit 120 controls the DTV communication unit 130 so that a captured image is transmitted wirelessly to the remote controller 200 and so that an edited image is received from the remote controller 200.

Furthermore, the DTV control unit 120 controls the DTV display 140 to display a broadcast, a captured image and an edited image, and controls the DTV storage unit 150 to store a broadcast and graphics.

Referring back to FIG. 2, the remote controller 200 comprises a remote control communication module 210, a remote control unit 220, an interface unit 230 and a remote control display 240.

The remote control communication module 210 is connected to the DTV 100 using RF communication, enabling mutual communication.

The interface unit 230 comprises a plurality of buttons to receive user commands. The plurality of buttons may include, for example, a power button, channel button, volume button, or selection button. A user may press a certain button to input a command corresponding to the button.

The interface unit 230 may be implemented as a touch pad, and may be used to receive a user edit command and edit a captured image.

The remote control display 240 displays a captured image received via the remote control communication module 210 from the DTV 100, and an edited image generated using the captured image.

While the interface unit 230 and the remote control display 240 are separated in the exemplary embodiment of the present invention, there is no limitation thereto. Accordingly, the present invention is also applicable to a situation in which the interface unit 230 and the remote control display 240 are combined in a single touch screen (not shown) if the DTV 100 is operated with a touch screen.

The remote control unit 220 transfers a user command input through the interface unit 230 to the DTV 100 via the remote control communication module 210.

Additionally, the remote control unit 220 controls an edited image generated in response to the user edit command input through the remote control display 240 to be displayed on the remote control display 240, and controls the edited image to be transmitted to the DTV 100 via the remote control communication module 210.

Therefore, it is possible for a user to actively and conveniently utilize a broadcast received from an external source.

Figure 5A:
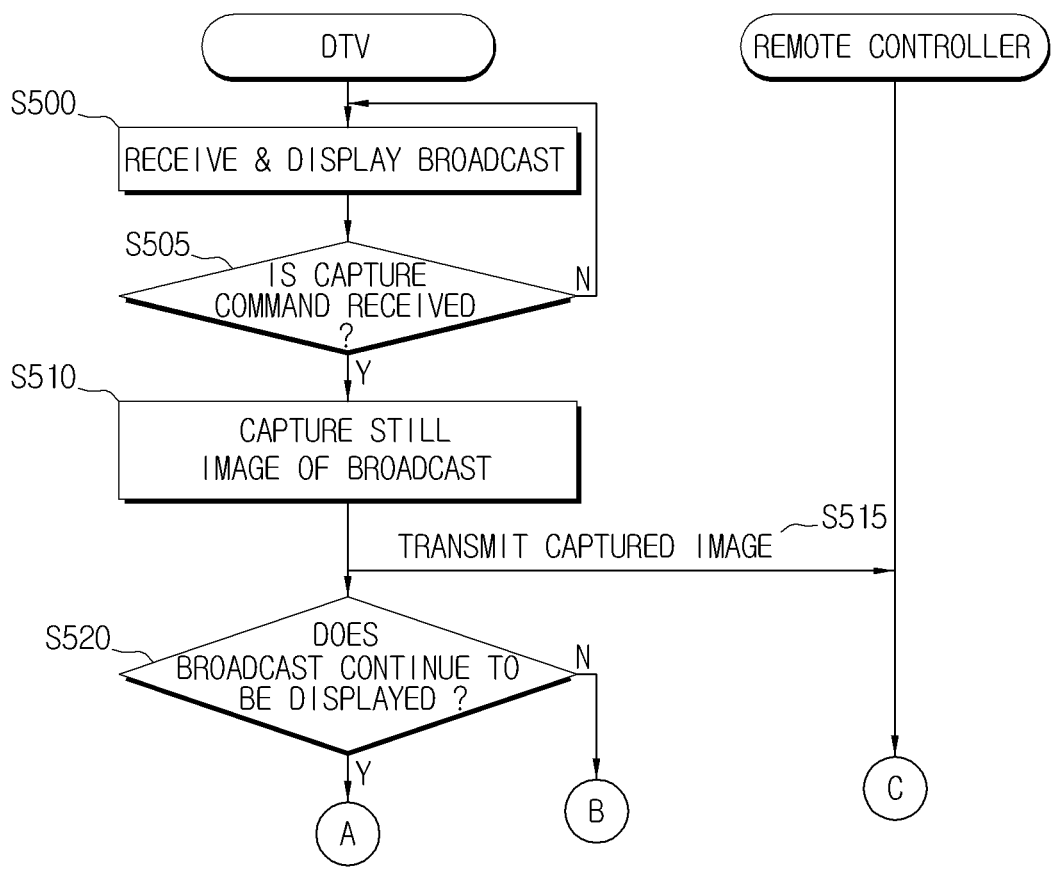
FIGS. 5A to 5C are flowcharts explaining a process for editing and displaying an image according to an exemplary embodiment of the present invention.
Figure 5B:
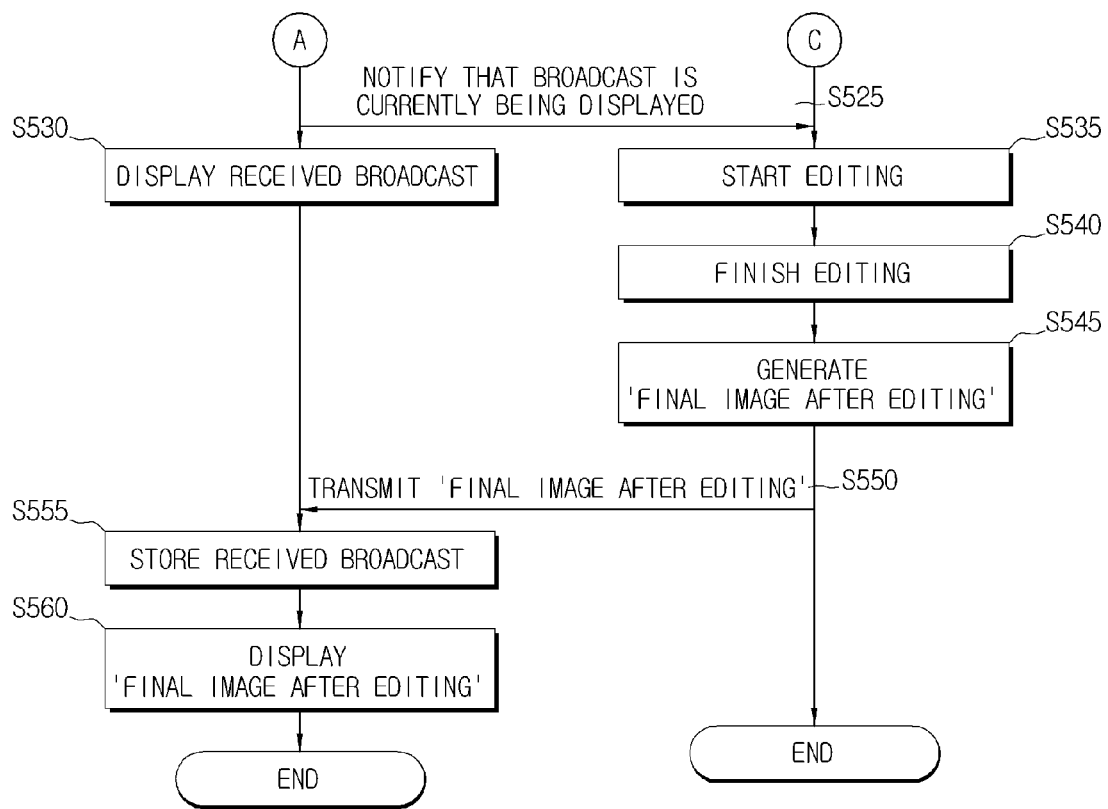
Figure 5C:
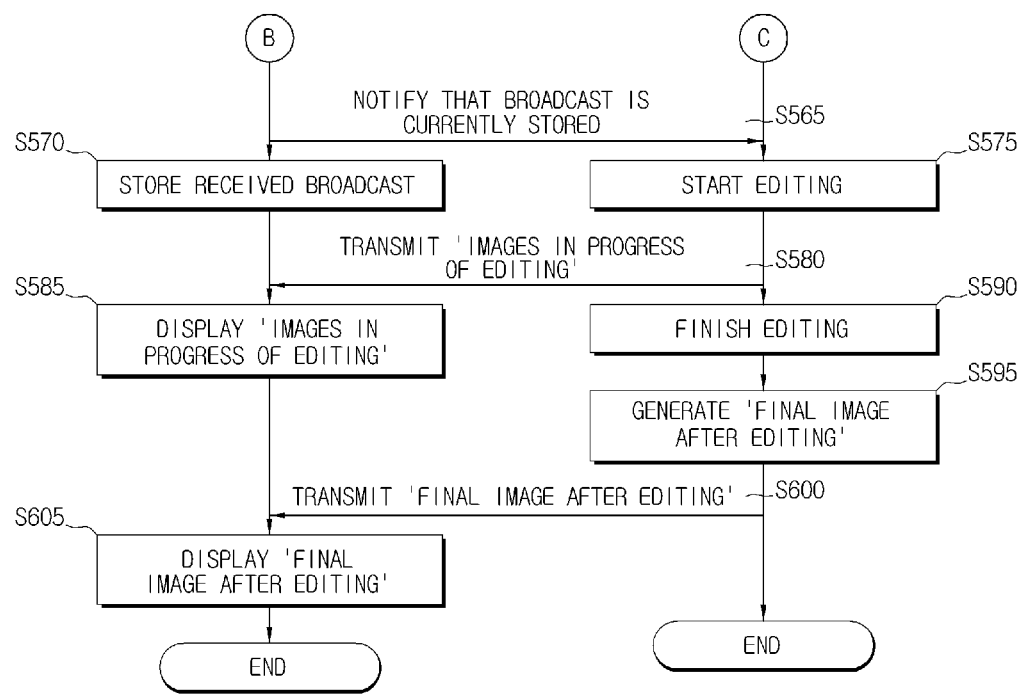

FIGS. 5A to 5C are flowcharts explaining a process for editing and displaying an image according to an exemplary embodiment of the present invention.

Referring to FIG. 5A, the DTV 100 receives a broadcast and displays the received broadcast in response to a user command to view the broadcast (S500).

The DTV 100 then determines whether a capture command is received to capture a still image of the currently displayed broadcast (S505). The capture command may be received by a user pressing a button (not shown) on the remote controller 200, or pressing a button (not shown) on the DTV 100.

If it is determined that the capture command is received (S505-Y), the DTV 100 captures a still image of the currently displayed broadcast at the time of receiving the capture command (S510), and transmits the captured image to the remote controller 200 (S515).

After receiving the capture command, the DTV 100 determines whether to continue to display the currently displayed broadcast (S520). Here, whether to continue to display the currently displayed broadcast may be determined according to the user settings.

If the currently displayed broadcast is set to continue to be displayed after the capture command is received (S520-Y, A), the DTV 100 transmits the captured image to the remote controller 200 while continuing to display the currently displayed broadcast. Alternatively, if display of the currently displayed broadcast is set to be paused (S520-Y, B), the DTV 100 pauses the display of the currently displayed broadcast, and instead displays the captured image.

The setting of whether to continue to display the current displayed broadcast or pause display of the currently displayed broadcast may be determined before the capture command is received and also may be determined after the capture command is received.

Hereinafter, a situation A in which the currently displayed broadcast is set to continue to be displayed, and a situation B in which display of the currently displayed broadcast is set to be paused will be described with reference to FIGS. 5B and 5C.

FIG. 5B is a view provided to explain a process for editing and displaying an image in situation A.

In situation A, the DTV 100 notifies the remote controller 200 that the broadcast is currently being displayed (S525), in order to prevent edited image in progress from being transmitted from the remote controller 200 to the DTV 100.

The currently displayed broadcast is set to continue to be displayed on the DTV 100 (S530), so even if the remote controller 200 transmits the edited image in progress to the DTV 100, the DTV 100 may not display the edited image in progress. Accordingly, transmitting the edited image in progress to the DTV 100 may become unnecessary, and thus the DTV 100 may no longer receive the unnecessary images by notifying the remote controller 200 that the broadcast is currently being displayed.

However, this is merely an example, so the edited image in progress may be transmitted to the DTV 100 even when the broadcast is set to continue to be displayed. In that case, the DTV 100 may receive the edited image in progress and store the received image in case that a user enters a command to display the edited image in progress stored in the DTV 100.

The remote controller 200 starts editing the captured image received from the DTV 100 (S535). If the editing operation is finished (S540), the remote controller 200 generates a final edited image (S545).

In this situation, the images which are presented while editing is in progress by operations S535 and S540 are displayed on the remote controller 200. In more detail, the edited image in progress generated in response to the user edit command may be displayed on the remote control display 240 in real time.

The remote controller 200 transmits the final edited image to the DTV 100 (S550).

After receiving the final edited image, the DTV 100 stores the currently received broadcast (S555), and displays the final edited image instead of the broadcast (S560).

In this situation, the user may have the option of determining whether the final edited image is caused to be transmitted to the DTV 100.

For example, if a user does not set the final edited image generated by the remote controller 200 to be transmitted to the DTV 100, it is not required for the final edited image to be transmitted from the remote controller 200 to the DTV 100. Additionally, if the final edited image is transmitted to the DTV 100, but if the user desires to continue to view a currently displayed broadcast rather than viewing the final edited image, the DTV 100 may store the final edited image received from the remote controller 200 and continue to display the currently displayed broadcast.

FIG. 5C is a view provided to explain a process for editing and displaying an image in situation B.

In situation B, the DTV 100 notifies the remote controller 200 that the broadcast is currently stored (S565), in order to receive the edited image in progress from the remote controller 200.

Since display of the currently displayed broadcast is set to be paused, it is possible for the remote controller 200 to transmit the edited image in progress to the DTV 100. In other words, the DTV 100 needs to receive the edited image in progress from the remote controller 200 and display the received images. Accordingly, the DTV 100 may request the remote controller 200 to transmit the edited image in progress, by notifying the remote controller 200 that the broadcast is currently stored.

While notifying that the broadcast is currently stored, the DTV 100 stores the currently received broadcast instead of displaying the broadcast (S570).

However, this is merely an example, so the edited image in progress may not be transmitted to the DTV 100 even when the display of the currently displayed broadcast is set to be paused. In that case, the DTV 100 stores the received broadcast to display it in case that the user enters a command to display the stored broadcast.

The remote controller 200 starts editing the captured image received from the DTV 100 (S575). If the editing operation is finished (S590), the remote controller 200 generates a final edited image (S595).

In this situation, the images which are presented while editing is in progress in operations S575 and S590 are displayed on the remote controller 200. In more detail, the edited image in progress generated in response to the user edit command may be displayed on the remote control display 240 in real time.

Additionally, the edited image in progress generated by operations S575 and S590 are also displayed on the DTV 100 (S585). More specifically, the remote controller 200 transmits the edited image in progress to the DTV 100 in real time, and the DTV 100 receives the edited image in progress and displays the received images in real time.

After the editing is finished, the remote controller 200 transmits the final edited image to the DTV 100 (S600).

The DTV 100 receives the final edited image from the remote controller 200 and displays the final edited image (S605).

Therefore, it is possible for a user to actively and conveniently utilize broadcast content received from an external source.

Figure 6A:
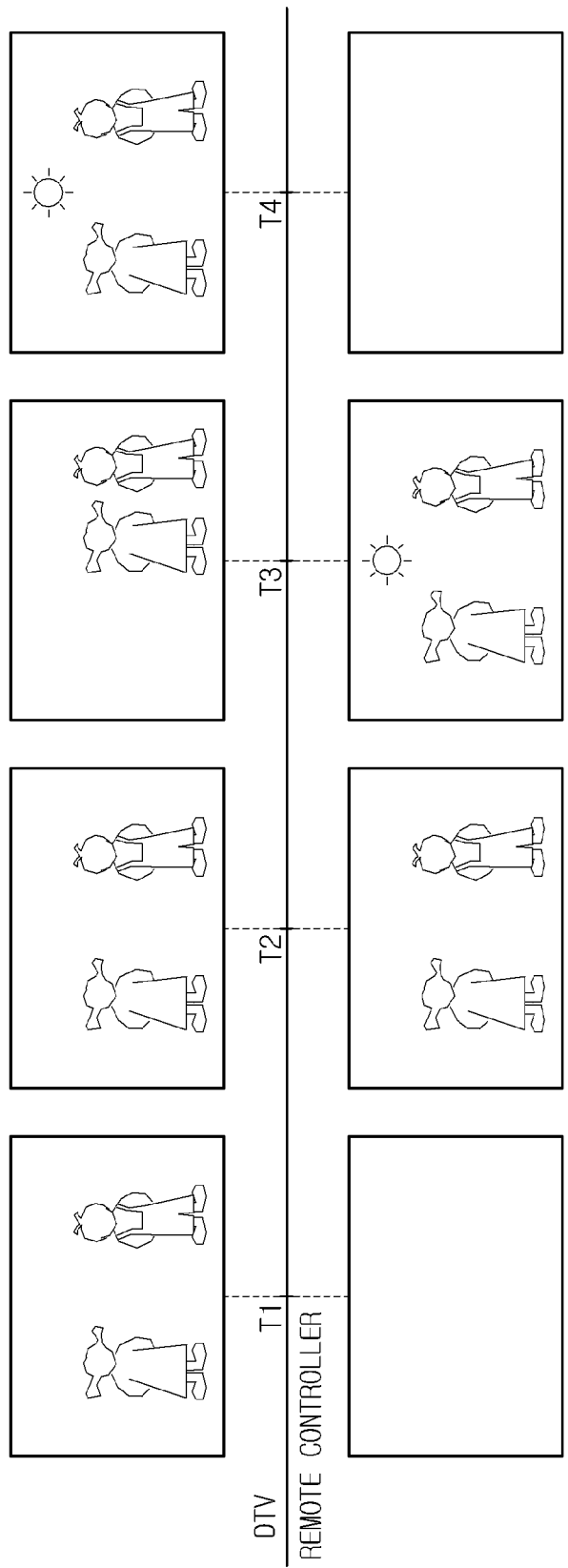

FIGS. 6A and 6B are views provided to explain images displayed on the DTV 100 and remote controller 200 in temporal sequence. FIG. 6A exemplarily illustrates images displayed on the DTV 100 and remote controller 200 when the currently displayed broadcast is set to continue to be displayed, that is when the edited image in progress is set not to be displayed on the DTV 100.

In FIG. 6A, T1 indicates a time before the capture command is received. Before the capture command is received, a currently received broadcast is displayed on the DTV 100, but nothing is displayed on the remote controller 200.

T2 indicates a time at which the capture command is received. In response to the capture command, the DTV 100 transmits the captured image to the remote controller 200, and the remote controller 200 then displays the captured image.

T3 indicates a time at which the editing operation is finished. Since the currently displayed broadcast is set to continue to be displayed, the DTV 100 continues to display the currently received broadcast and the remote controller 200 continues to display the edited image in progress, during the interval between T2 and T3.

T4 indicates a time at which a transmission command to transmit the final edited image is received. In response to the transmission command, the final edited image displayed on the remote controller 200 is transmitted to the DTV 100, so the DTV 100 displays the final edited image but nothing is displayed on the remote controller 200.

FIG. 6B exemplarily illustrates images displayed on the DTV 100 and remote controller 200 when display of the currently displayed broadcast is set to be paused, that is when the edited image in progress is set to be displayed on the DTV 100.

In FIG. 6B, T5 indicates a time before the capture command is received. Before the capture command is received, a currently received broadcast is displayed on the DTV 100, but nothing is displayed on the remote controller 200.

T6 indicates a time at which the capture command is received. In response to the capture command, the DTV 100 displays the captured image and transmits the captured image to the remote controller 200, and the remote controller 200 then displays the captured image.

T7 indicates a time before the editing operation is finished, that is a time during which the images are currently being edited. Since the display of the currently displayed broadcast is set to be paused, the remote controller 200 continues to display the edited image in progress and transmit the images in real time during the interval between T6 and T7. The DTV 100 stores the currently received broadcast, and displays the images received from the remote controller 200 in real time.

T8 indicates a time at which a transmission command to transmit the final edited image is received. In response to the transmission command, the final edited image displayed on the remote controller 200 is transmitted to the DTV 100, so the DTV 100 displays the final edited image but nothing is displayed on the remote controller 200.

Therefore, it is possible for a user to actively and conveniently utilize broadcast content received from an external source.

While the DTV 100 and remote controller 200 display the captured image and edited image in the exemplary embodiment of the present invention, this is merely an example for convenience of description. Accordingly, the present invention is also applicable to apparatuses other than the DTV 100 and remote controller 200.

In more detail, the DTV 100 has been described in the exemplary embodiment of the present invention, but there is no limitation to such a broadcast receiving apparatus. Accordingly, the present invention is also applicable to any image displaying apparatus capable of displaying an image. Additionally, the remote controller 200 has been described in the exemplary embodiment of the present invention, but there is no limitation to such a remote control apparatus. Accordingly, the present invention is equally applicable to any image apparatus capable of editing and displaying an image.

Furthermore, while the edited image is generated by adding graphics created or preset by a user to the captured image in the exemplary embodiment of the present invention, this is merely an example for convenience of description. Accordingly, the present invention is also applicable to a situation in which an edited image comprises only graphics created or preset by a user rather than comprising a captured image.

For example, if a user who is not skilled at drawing draws along an outline of an object appearing on a still image while viewing the still image displayed on a display such as a touch screen, only lines drawn by the user may be referred to as edited image graphics created or preset by a user.

Additionally, the edited image representing the graphics superimposed on the captured image is displayed in the exemplary embodiment of the present invention, but the present invention is also applicable to a situation in which the edited image is displayed along with data containing a variety of information. For example, the edited image may be displayed together with information regarding an editor who generates the edited image which includes information regarding the name, address or organism to which the editor belongs, and along with information on the time at which the editing operation is finished, which includes information regarding the date and time at which the editing operation is finished. Additionally, the edited image may be displayed along with another edited image that has been already generated and is relevant to the edited image, or with information regarding the other edited image.

As described above, according to an exemplary embodiment of the present invention, it is possible for a user to actively and conveniently utilize content received from an external source.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A portable display apparatus comprising:
   an image processing unit which captures an image of a video;

a communication module which transmits the captured image to an external device, and receives an edited image generated using the captured image received from the external device; and a control unit which controls the video or the edited image to be displayed according to whether the image of the video is captured or whether the edited image is received.

2. The portable display apparatus as claimed in claim 1, wherein the edited image comprises at least one of an edited image in progress, that is presented while editing of the captured image is in progress, and a final edited image that is presented after the captured image is completely edited.

3. The portable display apparatus as claimed in claim 2, wherein, if the image of the video is captured, the control unit controls such that display of the video is paused and that the edited image in progress which is received from the external device is displayed.

4. The portable display apparatus as claimed in claim 2, wherein, if the final edited image is received, the control unit controls such that display of the video is paused and that the final edited image is displayed.

5. The portable display apparatus as claimed in claim 3, wherein the video is a broadcast being displayed, and if display of the broadcast is paused, the control unit controls such that a portion of the broadcast received from a time when the display of the broadcast is paused is stored.

6. The portable display apparatus as claimed in claim 1, wherein, if a command to store the video is received, the control unit replaces the captured image with the edited image and controls the video to be stored.

7. A system comprising:

a portable display device which captures an image of a video, receives an edited image generated using the captured image, and displays the video or the edited image according to whether the image of the video is captured or whether the edited image is received; and a controller which receives the captured image from the portable display device, edits the received image and transmits the edited image to the portable display device.

8. The system as claimed in claim 7, wherein the portable display device receives the edited image from the controller in real time.

9. The system as claimed in claim 7, wherein the portable display device is an apparatus which receives a broadcast and displays the received broadcast, and the controller is a remote control apparatus which is connected to the portable display device wirelessly to operate the portable display device.

10. An image displaying method of a portable display device comprising:

capturing an image of a video;

transmitting the captured image to an external device;

receiving an edited image from the external device; and displaying the video or the edited image.

11. The image displaying method of the portable display device as claimed in claim 10, wherein the edited image comprises at least one of an edited image in progress, that is presented while editing of the captured image is in progress, and a final edited image that is presented after the captured image is completely edited.

12. The image displaying method of the portable display device as claimed in claim 11, wherein the displaying comprises, if the image of the video is captured, controlling such that display of the video is paused and that the edited image in progress which is received from the external device is displayed.

13. The image displaying method of the portable display device as claimed in claim 11, wherein the displaying comprises, if the final edited image is received, controlling such that display of the video is paused and that the final edited image is displayed.

14. The image displaying method of the portable display device as claimed in claim 10, further comprising:

receiving a command to store the video; and replacing the captured image with the edited image and storing the video, if the command to store the video is received.

* * * * *